March 7, 1967 R. N. MEYER 3,307,586
SERVO VALVE
Filed April 1, 1964

INVENTOR.
ROBERT NORMAN MEYER
BY
Jack C. Munro
- AGENT -

United States Patent Office 3,307,586
Patented Mar. 7, 1967

3,307,586
SERVO VALVE
Robert Norman Meyer, Anaheim, Calif., assignor to Douglas Aircraft Company, Inc., Santa Monica, Calif.
Filed Apr. 1, 1964, Ser. No. 356,452
3 Claims. (Cl. 137—625.69)

This invention relates to spool type valves and, more particularly to hydraulic servo valves having a reciprocating spool to control the flow of fluid through the valve.

More specifically, this invention is concerned with a spool type valve in which the fluid flow control edges of the spool may be adjusted to exact axial relationships to each other, or adjusted to exact axial relationships to corresponding fixed edges of the surrounding valve body annular chambers. In known spool type valves the relationship of the above mentioned edges is the result of axial machining tolerances, and obtaining exact axial relationships require that the axial distance between these edges be machined to zero tolerances.

It is the object of this invention to provide a spool type valve in which spool control land edges may be adjusted to exact axial relationships to each other, or adjusted to exact axial relationship to their corresponding fixed edges of surrounding valve body annular chambers, and is a valve that is highly efficient in operation.

The many advantages of a means to axially adjust selected spool control land edges will become readily apparent to those skilled in the art upon reading the following detailed description and examining the accompanying drawings.

Figure 1:
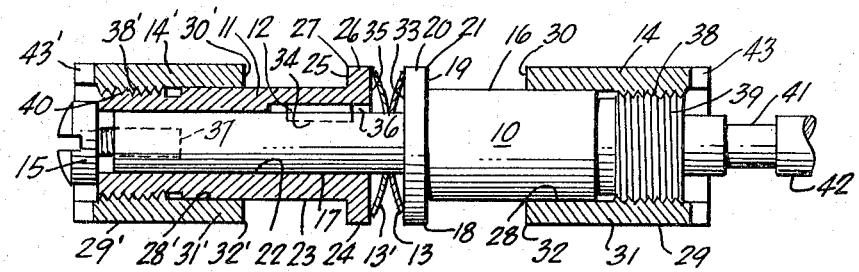
FIGURE 1 is a cross sectional view of a spool assembly embodying this invention.

Referring to FIGURE 1 it is seen that the spool assembly of this invention is comprised of; the spool main body 10, power port sleeve 11, key 12, two Belleville type springs 13 and 13', two return port sleeves 14 and 14', and power port adjusting screw 15. Diameter 16, diameter 17, and diameter 18 on the spool main body 10 are machined to be concentric to each other. Face 19 of control land 20 is machined to be perpendicular to diameter 18 making control land edge 21 a right angle edge. Bore 22 which is a precision slidable fit over diameter 17, diameter 23, and diameter 24 on power port sleeve 11 are machined to be concetric to each other. Face 25 of control land 26 is machined to be perpendicular to diameter 24 making control land edge 27 a right angle edge. Bore 28 which is a precision slidable and turntable fit over diameter 16, and diameter 29 on the return port sleeve 14 are machined to be concentric to each other. Face 30 of control land area 31 is machined to be perpendicular to diameter 29 making control land edge 32 a right angle edge. Similarly, bore 28' which is a precision slidable and turnable fit over diameter 23, and diameter 29' on the return port sleeve 14' are machined to be concentric to each other. Face 30' of control land area 31' is machined to be perpendicular to diameter 29' making control land edge 32' a right angle edge.

Two Belleville type springs 13 and 13' having their convex sides facing each other are disposed over diameter 17 with the outside edge of the concave side of spring 13 in contact with face 33 of control land 20. Key 12 is inserted into closely fitting slot 34 in main spool body 10. The depth of slot 34 results in a portion of key 12 protruding above diameter 17. Power port sleeve 11 is concentrically disposed over diameter 17 with face 35 of control land 26 in contact with the outside edge of the concave side of spring 13' and slot 36 aligned with and captivating key 12. Power port adjusting screw 15 is partially threaded into the main spool body 10 by means of tapped hole 37 and forces power port sleeve 11 along diameter 17 to partially compress spring 13 and 13'. Return port sleeve 14 is concentrically disposed over main spool body 10 with bore 28 contacting diameter 16 and internal thread 38 engaging external thread 39. Similarly, return port sleeve 14' is concentrically disposed over power port sleeve 11 with bore 28' contacting diameter 23 and internal thread 38' engaging external thread 40.

The means to adjust spool control land edges 21, 27, 32, and 32' to exact axial relationships to each other are evident. It is seen that holding the spool assembly by means of flats 42 on activating rod 42 and further threading screw 15 into tapped hole 37, that the axial distance between control land edges 21 and 27 will be reduced and also further compress springs 13 and 13'. If this adjustment results in the axial distance between edges 21 and 27 being less than desired, the axial distance may be increased by partially unthreading screw 15 from tapped hole 37, thus allowing compressed springs 13 and 13' to force power port sleeve 11 back along diameter 17 to the position where the axial distance between edges 21 and 27 is at the exact desired relationship. Holding the spool assembly again by means of flats 41 on activating rod 42 and rotating return port sleeve 14 on thread 39 and diameter 16 by means of slots 43, an exact axial relationship between control land edges 32 and 21, or 32 and any of the other control land edges may be obtained. Similarly, establishing an exact axial relationship between control land edge 32' and any of the other control land edges may be obtained by rotating return port sleeve 14' on thread 40 and diameter 23 by means of slots 43'. Any rotational movement of power port sleeve 11 relative to spool main body 10 induced by the turning of screw 15 which bears directly on power port sleeve 11, or by the turning of sleeve 14' which contacts power port sleeve 11 at thread 40 and diameter 23, will be prohibited by key 12, thus maintaining the previously adjusted axial relationship of edges 21 and 27.

Figure 2:
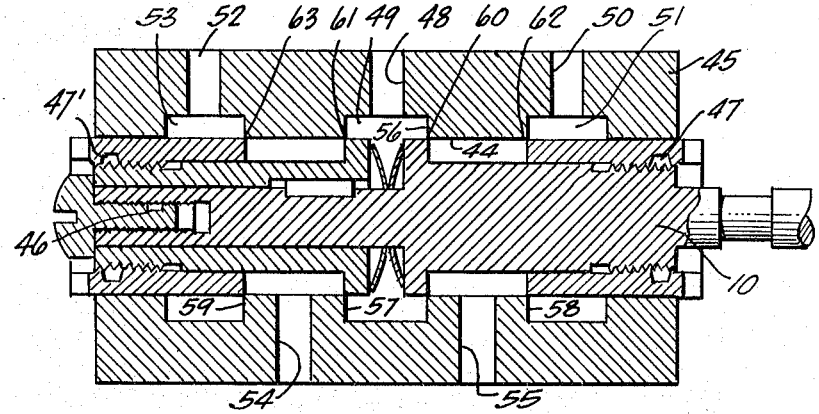
FIGURE 2 is a cross sectional view of a spool assembly and valve body embodying this invention.

Referring now to FIGURE 2, the above described spool assembly is shown concentrically disposed within bore 44 of valve body 45. It will be noted that a pliable thread locking insert 46 may be added to screw 15 and pliable thread locking rings 47 and 47' may be added to return port sleeve 14 and 14' respectively if desired. It is further shown that power port passage 48 connects with power port annual chamber 49, number one return port passage 50 connects with number one return port annular chamber 51, number two return port passage 52 connects with number two return port annual chamber 53, number one load passage 54 and number two load port passage 55 connect directly with bore 44. Walls 56 and 57 of chamber 49, and wall 58 of chamber 51, plus wall 59 of chamber 53 are machined to be perpendicular to bore 44 making fixed edges 60, 61, 62, and 63 right angle edges.

To obtain exact axial relationships of the spool control land right angle edges to corresponding fixed right angle edges of the valve body annular chambers, which for example will be the exact alignment of edge 21 to 60, and edge 27 to 61, and edge 32 to 62, and edge 32' to 63, the following procedure is followed. The entire spool assembly is moved axially in bore 44 by means of rod 42 to a position where edges 21 and 60 are exactly aligned. Spool main body 10 is then secured by means of rod 42 to prevent further axial movement relative to valve body 45 and prevented from rotating by means of flats 41. Next edges 27 and 61 are exactly aligned by turning screw 15 clockwise to move sleeve 11 forward or turning screw 15 counter-clockwise to allow compressed springs 13 and 13' to move sleeve 11 back. Turning sleeve 14 by means of slots 43 will allow edges 32 and 62 to be exactly aligned, and turning sleeve 14' by means of slots 43' will allow edges 32' and 63 to be exactly aligned. Again, key 12 will prevent the rotation of sleeve 11 relative to main spool body 10 when the above adjustments are made, thus maintaining the alignment of edges 21 and 60 and 27 and 61. It is to be understood that other desired axial relationships of these edges such as overlapping or underlapping may be obtained in the same manner.

Figure 3:
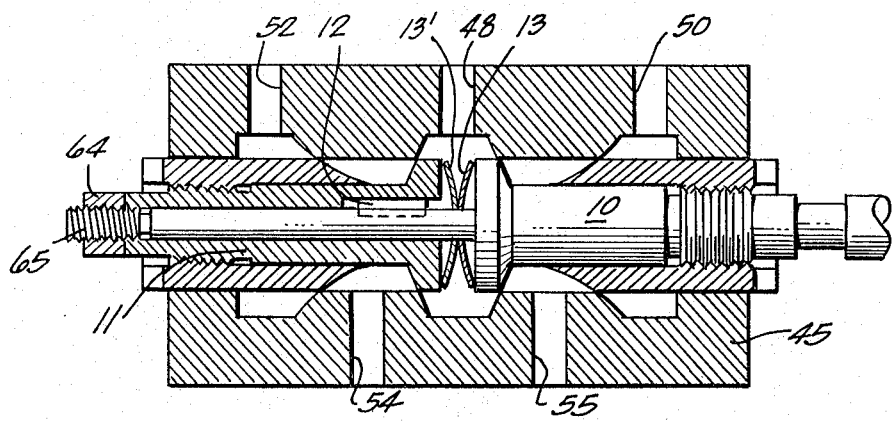
FIGURE 3 is a cross sectional view of a modified spool assembly and modified valve body embodying this invention.

It is apparent that the adjustment features of this invention eliminates the necessity of close tolerance axial machining of the spool control land edges and the valve body port annular chamber edges. The elimination of close tolerance axial machining will also make it practical to machine the above mentione edges to other than right angles. In the modified valve assembly shown in FIGURE 3, the edges corresponding to right angle edges 21, 27, 60, and 61 of FIGURES 1 and 2 are machined at 69 degrees, and the edges corresponding to right angles 32, 32', 62, and 63 of FIGURES 1 and 2 are contoured. The edges shown in FIGURE 3 are not intended to be ideal configurations, but intended only to illustrate some of the possible variations from the usual right angle edge. Certain edge configurations will result in less pressure drop through the valve, reduced control land edge wear caused by dust or foreign particles which may be present in the controlled fluid, or increased fluid flow through the valve. All configurations will reduce internal leakage to a minimum and allow each valve of a given design to have identical flow versus spood displacement characteristics when properly designed and adjusted.

The configurations shown in FIGURES 1 and 2 are applicable to spools with control land diameters as small as one quarter of an inch. The valve assembly shown in FIGURE 3 is applicable to spools with control land diameters as small as three-sixteenths of an inch. It will be noted in FIGURE 3, power port adjusting nut 64 performs the function of power port adjusting screw 15 of FIGURE 1 and partially threaded rod 65 performs the functions of tapped hole 37 and diameter 17 of FIGURE 1. All other items shown in FIGURE 3 perform the same functions as the corresponding items shown in FIGURES 1 and 2.

It is to be understood that while there have been described herein and illustrated in the accompanying drawings two versions of this invention, various modifications, omissions and refinements which depart from the disclosed embodiments may be adopted without departing from the spirit and scope of this invention.

I claim:
1. A valve assembly for controlling the flow of a hydraulic fluid comprising:
   a valve body having a longitudinal bore therethrough, a fluid conducting annual chamber contained within said bore of said valve body;
   a valve spool slidably contained within said bore, said valve spool having a plurality of longitudinally spaced lands thereon, said valve spool being formed of first and second members, said second member being longitudinally slidably mounted on a portion of said first member, each of said first and second members having one of said lands thereon, said lands coacting to form a single unit capable of preventing fluid flow to and from said annular chamber;
   a longitudinal adjustment means, said adjustment means being operable between said first and second members, whereby the longitudinal dimension of said coacting lands are to be adjustably spaced to be equal to the longitudinal dimension of the annular chamber.

2. A valve assembly for controlling flow of a hydraulic fluid as defined in claim 1 wherein:
   a spring means being operable between said coacting lands, said spring means being in a constant state of compression, whereby said coacting lands are maintained the allowed maximum longitudinal distance apart.

3. A valve assembly for controlling flow of a hydraulic fluid as defined in claim 1 wherein.
   said adjustment means is by means of screw threads, whereby a minute adjustment of the spacing between the lands is possible.

References Cited by the Examiner
UNITED STATES PATENTS

| 139,463 | 6/1873 | Gibbs | 137—625.69 |
| 901,141 | 10/1908 | Baker | 137—625.69 |
| 2,942,583 | 6/1960 | Rue | 137—625.69 |
| 2,989,989 | 6/1961 | Whaley et al. | 137—625.69 |

FOREIGN PATENTS

| 1,308,618 | 10/1962 | France. |

M. CARY NELSON, *Primary Examiner.*
HENRY T. KLINKSIEK, *Examiner.*